(12) United States Patent
Furukawa et al.

(10) Patent No.: US 10,872,147 B2
(45) Date of Patent: Dec. 22, 2020

(54) SOFTWARE ATTACK DETECTION DEVICE, NON-TRANSITORY COMPUTER-READABLE STORAGE MEDIUM, AND SOFTWARE ATTACK DETECTION METHOD

(71) Applicant: FUJITSU LIMITED, Kawasaki (JP)

(72) Inventors: Kazuyoshi Furukawa, Kawasaki (JP); Masahiko Takenaka, Kawasaki (JP); Hirotaka Kokubo, Minato (JP)

(73) Assignee: FUJITSU LIMITED, Kawasaki (JP)

( * ) Notice: Subject to any disclaimer, the term of this patent is extended or adjusted under 35 U.S.C. 154(b) by 254 days.

(21) Appl. No.: 15/820,913

(22) Filed: Nov. 22, 2017

(65) Prior Publication Data
US 2018/0150633 A1    May 31, 2018

(30) Foreign Application Priority Data

Nov. 28, 2016  (JP) ................................. 2016-230520

(51) Int. Cl.
*G06F 21/55* (2013.01)
*G06F 21/52* (2013.01)
*G06F 21/57* (2013.01)

(52) U.S. Cl.
CPC ............ *G06F 21/552* (2013.01); *G06F 21/52* (2013.01); *G06F 21/554* (2013.01); *G06F 21/577* (2013.01)

(58) Field of Classification Search
CPC .... G06F 21/552; G06F 21/577; G06F 21/554; G06F 21/52; H04L 63/1441; H04L 63/1433
See application file for complete search history.

(56) References Cited

U.S. PATENT DOCUMENTS

| 6,006,328 A | * | 12/1999 | Drake | ..................... G06F 21/14 |
| | | | | 713/188 |
| 6,988,208 B2 | * | 1/2006 | Hrabik | ................ H04L 63/1433 |
| | | | | 726/23 |
| 8,042,178 B1 | * | 10/2011 | Fisher | ................. H04L 63/1416 |
| | | | | 726/22 |

(Continued)

FOREIGN PATENT DOCUMENTS

| JP | 2005-136526 | 5/2005 |
| JP | 2011-198022 | 10/2011 |

(Continued)

OTHER PUBLICATIONS

JPOA—Office Action of Japanese Patent Application No. 2016-230520 dated Oct. 13, 2020 with Machine Translation.

(Continued)

*Primary Examiner* — Maung T Lwin
*Assistant Examiner* — Sanchit K Sarker
(74) *Attorney, Agent, or Firm* — Fujitsu Patent Center

(57) ABSTRACT

A software detection device, the device including a memory and a processor coupled to the memory and the processor configured to execute a process, the process including generating at least one notification in response to at least one countermeasure process applied to a program to address a vulnerability to a software attack, each of the at least one notification including a countermeasure identifier to identify a countermeasure process performed, monitoring the at least one generated notification, and determining presence of the software attack based on the monitoring.

14 Claims, 19 Drawing Sheets

(56) References Cited

U.S. PATENT DOCUMENTS

| | | | |
|---|---|---|---|
| 9,203,862 B1* | 12/2015 | Kashyap | H04L 63/145 |
| 2004/0064722 A1* | 4/2004 | Neelay | G06F 8/60 |
| | | | 726/25 |
| 2004/0193892 A1* | 9/2004 | Tamura | H04L 63/1458 |
| | | | 713/182 |
| 2005/0091513 A1 | 4/2005 | Mitomo et al. | |
| 2010/0205651 A1* | 8/2010 | Yanoo | G06F 21/554 |
| | | | 726/1 |
| 2012/0180133 A1* | 7/2012 | Al-Harbi | H04L 63/1433 |
| | | | 726/25 |
| 2015/0256554 A1* | 9/2015 | Sakakibara | G06F 11/34 |
| | | | 726/25 |
| 2016/0112445 A1* | 4/2016 | Abramowitz | G06Q 40/08 |
| | | | 726/23 |
| 2016/0197790 A1 | 7/2016 | Tsuchiya et al. | |
| 2016/0323304 A1* | 11/2016 | Terada | H04L 63/1408 |
| 2018/0295147 A1* | 10/2018 | Haga | H04W 4/40 |

FOREIGN PATENT DOCUMENTS

| | | | | |
|---|---|---|---|---|
| JP | 2011198022 | * | 10/2011 | G06F 21/22 |
| JP | 2011198022 A | * | 10/2011 | |
| JP | 2013-196310 | | 9/2013 | |
| JP | 2015-198301 | | 9/2015 | |

OTHER PUBLICATIONS

Security Center of the Information Processing Promotion Association, Part 3 Search on a technology concerning generation and execution of a secure execution code, a search report on security of open source software, Mar. 26, 2003, pp. 11 to 22, URL, https://www.ipa.go.jp/security/fy14/reports/oss_security/part3.pdf.

* cited by examiner

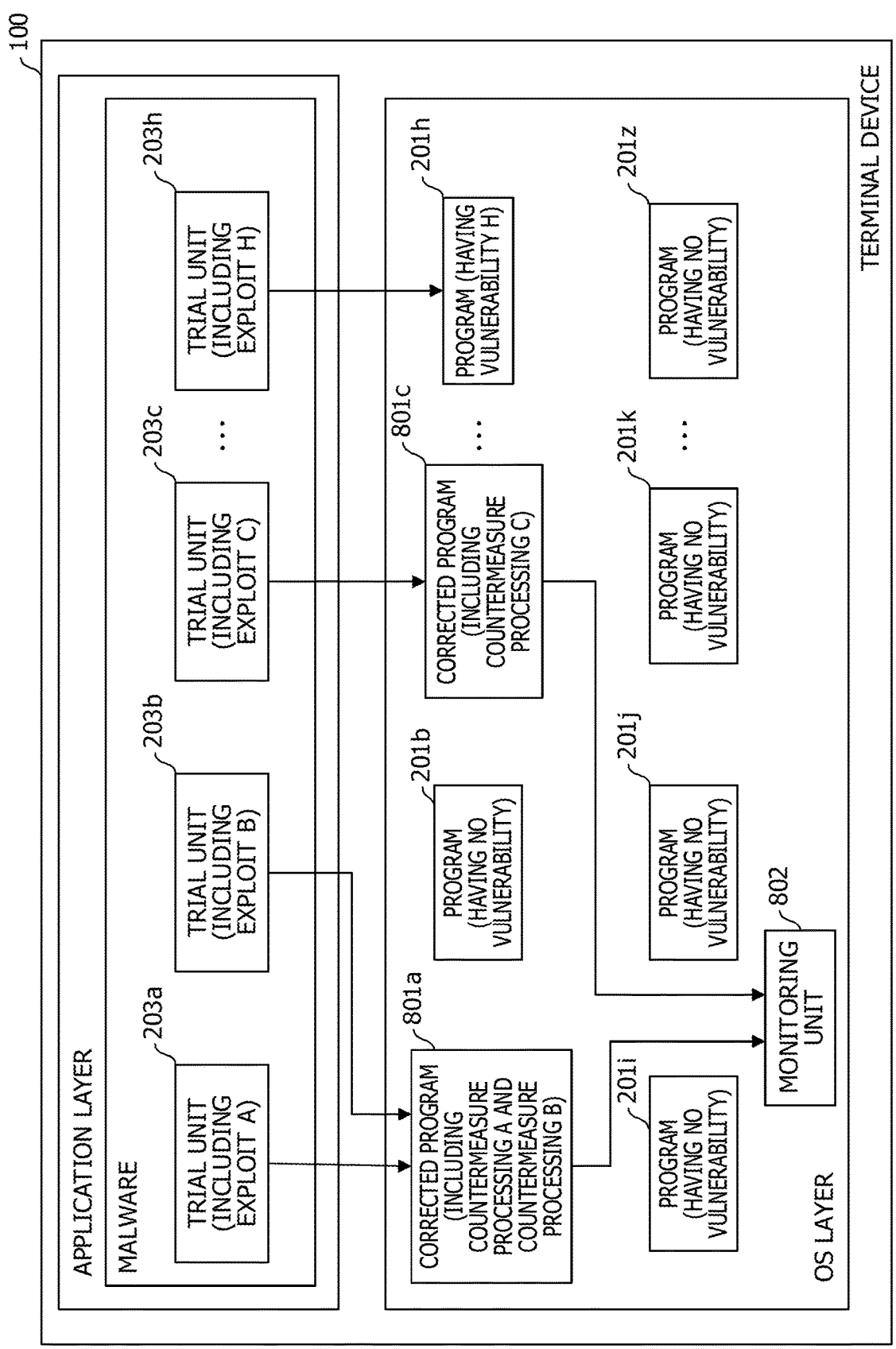

FIG. 10

| DATE AND TIME | COUNTERMEASURE PROCESSING IDENTIFIER | PROCESS NUMBER |
|---|---|---|
| T1 | code_a | P1 |
| T2 | code_b | P1 |
| T3 | code_c | P1 |
| T4 | code_d | P1 |
| ⋮ | ⋮ | ⋮ |

FIG. 11

| ALERT CONDITION | ALERT ACTION |
|---|---|
| code_a | POWER OFF |
| code_b | PROCESS DELETION |
| code_c | UNINSTALLATION |
| code_d | DISPLAY OF WARNING MESSAGE |
| ⋮ | ⋮ |

FIG. 13

| ALERT CONDITION | ALERT ACTION |
|---|---|
| code_b, code_c (ARBITRARY ORDER) | POWER OFF |
| code_d, code_e (ARBITRARY ORDER) | DISPLAY OF WARNING MESSAGE |
| code_f, code_g (ARBITRARY ORDER) | DISPLAY OF WARNING MESSAGE |
| ⋮ | ⋮ |

FIG. 14

| ALERT CONDITION | ALERT ACTION |
|---|---|
| code_b, code_c (LIMITED ORDER) | POWER OFF |
| code_d, code_e (LIMITED ORDER) | DISPLAY OF WARNING MESSAGE |
| code_f, code_g (LIMITED ORDER) | DISPLAY OF WARNING MESSAGE |
| ⋮ | ⋮ |

FIG. 15

| ALERT CONDITION | ALERT ACTION |
|---|---|
| THE TOTAL NUMBER OF NOTIFICATIONS $\geq 10$ | UNINSTALLATION |
| 10 > THE TOTAL NUMBER OF NOTIFICATIONS $\geq 5$ | PROCESS DELETION |
| 5 > THE TOTAL NUMBER OF NOTIFICATIONS $\geq 1$ | DISPLAY OF WARNING MESSAGE |
| ⋮ | ⋮ |

FIG. 16

| ALERT CONDITION | ALERT ACTION |
|---|---|
| THE NUMBER OF NOTIFICATIONS RELATED TO SAME PROCESS $\geqq 10$ | UNINSTALLATION |
| 10> THE NUMBER OF NOTIFICATIONS RELATED TO SAME PROCESS $\geqq 5$ | PROCESS DELETION |
| 5> THE NUMBER OF NOTIFICATIONS RELATED TO SAME PROCESS $\geqq 1$ | DISPLAY OF WARNING MESSAGE |
| ⋮ | ⋮ |

FIG. 17

| COUNTERMEASURE PROCESSING IDENTIFIER | ALERT LEVEL |
|---|---|
| code_a | HIGH |
| code_b | HIGH |
| code_c | HIGH |
| code_d | LOW |
| ⋮ | ⋮ |

FIG. 18

| ALERT CONDITION | ALERT ACTION |
|---|---|
| THE NUMBER OF NOTIFICATIONS CORRESPONDING TO HIGH ALERT LEVEL $\geqq 3$ | POWER OFF |
| THE NUMBER OF NOTIFICATIONS CORRESPONDING TO LOW ALERT LEVEL $\geqq 10$ | DISPLAY OF WARNING MESSAGE |
| ⋮ | ⋮ |

SOFTWARE ATTACK DETECTION DEVICE, NON-TRANSITORY COMPUTER-READABLE STORAGE MEDIUM, AND SOFTWARE ATTACK DETECTION METHOD

CROSS-REFERENCE TO RELATED APPLICATION

This application is based upon and claims the benefit of priority of the prior Japanese Patent Application No. 2016-230520, filed on Nov. 28, 2016, the entire contents of which are incorporated herein by reference.

FIELD

The embodiments discussed herein are related to a software attack detection device, a non-transitory computer-readable storage medium, and a software attack detection method.

BACKGROUND

Malware sneaking into a mobile phone, for example, may abuse a tool for verifying vulnerability of an operating system (OS). When the tool is used, a targeted attack may be mounted on the mobile phone using the OS having a vulnerability.

On the other hand, when a corrected program in which the vulnerability is solved is installed on the mobile phone, such an attack may be excluded. However, a corrected program for every vulnerability is not necessarily applied to each mobile phone.

Hence, an attacker searches for a clue for an attack by repeating trials related to various vulnerabilities.

CITATION LIST

Patent Document

[Patent Document 1] Japanese Laid-open Patent Publication No. 2011-198022

SUMMARY

According to an aspect of the embodiments, a software attack detection device, the device including a memory and a processor coupled to the memory and the processor configured to execute a process, the process including generating at least one notification in response to at least one countermeasure process applied to a program to address a vulnerability to a software attack, each of the at least one notification including a countermeasure identifier to identify a countermeasure process performed, monitoring the at least one generated notification, and determining presence of the software attack based on the monitoring.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8A is a diagram illustrating an outline of notifications by corrected programs;

FIG. 10 is a diagram illustrating an example of a log table;

FIG. 11 is a diagram illustrating an example of a condition table;

FIG. 13 is a diagram illustrating an example of a condition table in a second embodiment;

FIG. 14 is a diagram illustrating an example of a condition table in a third embodiment;

FIG. 15 is a diagram illustrating an example of a condition table in a fourth embodiment;

FIG. 16 is a diagram illustrating an example of a condition table in a fifth embodiment;

FIG. 17 is a diagram illustrating an example of a level table; and

FIG. 18 is a diagram illustrating an example of a condition table in a sixth embodiment.

DESCRIPTION OF EMBODIMENTS

In one aspect, it is an object of the present technology to facilitate detection of an attack focusing on vulnerability of a program.

First Embodiment

Figure 1:
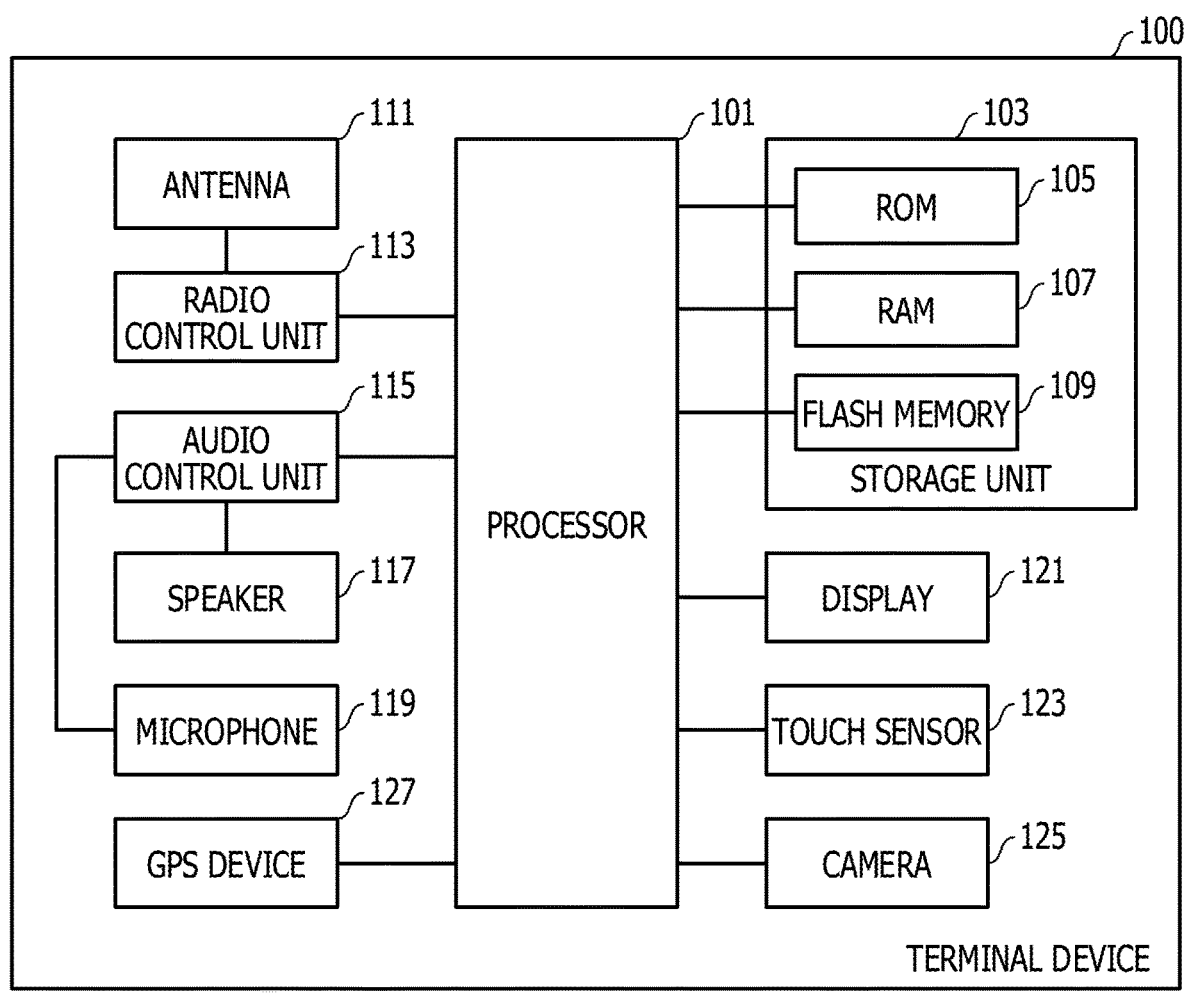
FIG. 1 is a diagram illustrating a hardware configuration example of a terminal device.

FIG. 1 illustrates a hardware configuration example of a terminal device. The terminal device 100 includes a processor 101, a storage unit 103, an antenna 111, a radio control unit 113, an audio control unit 115, a speaker 117, a microphone 119, a display 121, a touch sensor 123, a camera 125, and a global positioning system (GPS) device 127.

The processor 101 may be constituted of a modem central processing unit (CPU) and an application CPU. The storage unit 103, for example, includes a read only memory (ROM) 105, a random access memory (RAM) 107, and a flash memory 109. The ROM 105, for example, stores data set in advance and a program. The RAM 107, for example, includes an area in which a program such as an application and data are expanded. The flash memory 109 for example stores programs such as an OS and an application, and further stores data as needed.

The touch sensor 123 is, for example, a sensor in the form of a panel disposed on the display surface of the display 121. The touch sensor 123 receives touch operation. The display 121, for example, displays various kinds of screens made to be displayed by applications. For example, the display 121 and the touch sensor 123 are used integrally as a touch panel.

A touch event is generated by a touch operation on the touch sensor 123. Keys may be provided in addition to the touch sensor 123.

The antenna 111, for example, receives radio data of a cellular system. The radio control unit 113 controls radio communication. Telephone voice communication and data communication are performed by controlling the radio communication.

The audio control unit 115 performs analog/digital conversion and digital/analog conversion of sound data. The speaker 117 outputs analog data as sound. The microphone 119 converts sound into analog data.

The camera 125 is used to photograph a moving image or a photograph image. The GPS device 127 measures a position.

Figure 2:
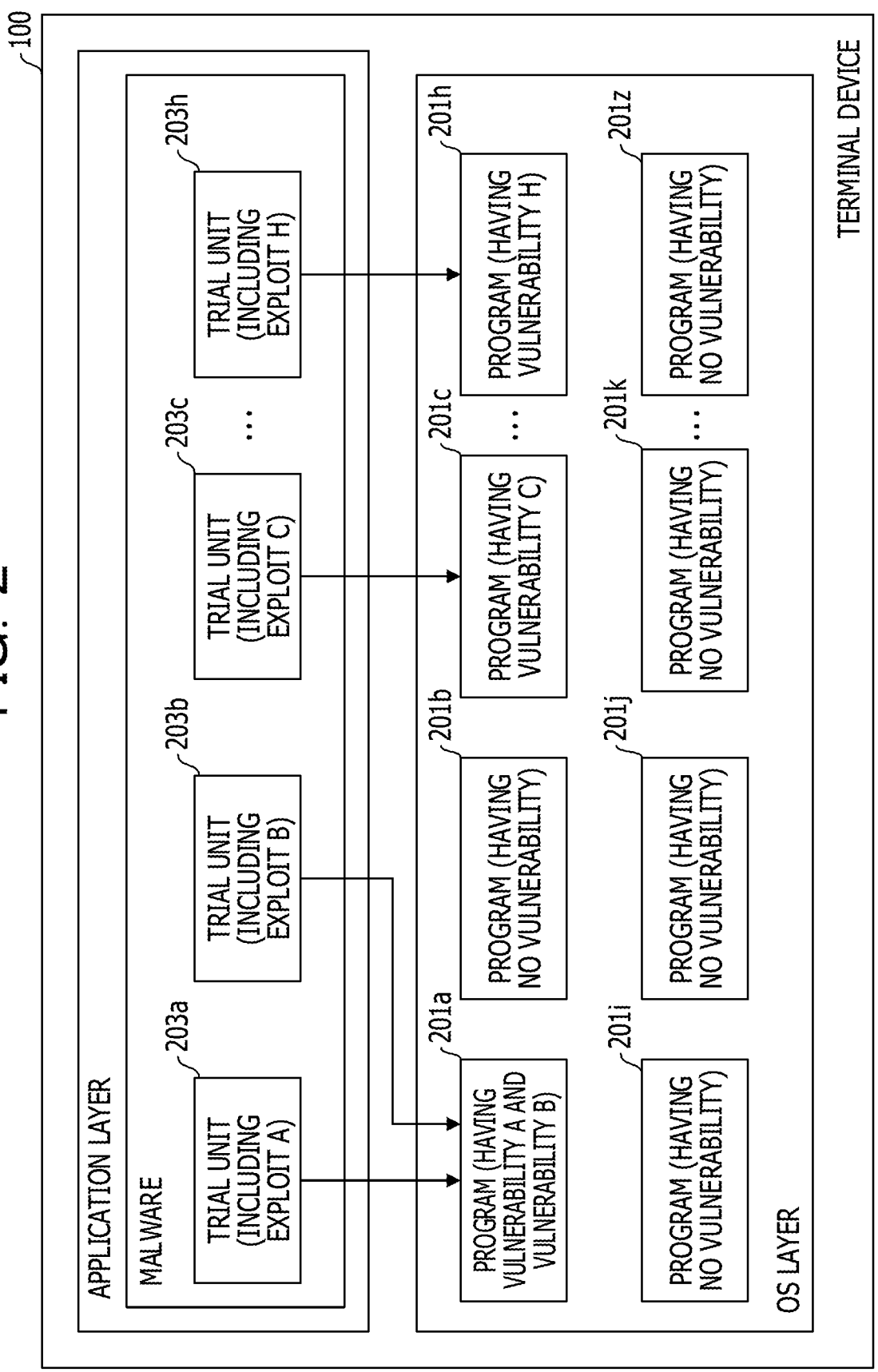
FIG. 2 is a diagram illustrating an outline of an attack by malware.

FIG. 2 illustrates an outline of an attack by malware. Suppose in the present example that an OS layer includes programs 201a to 201z. Then, suppose that the program 201a has a vulnerability A and a vulnerability B. In addition, suppose that the program 201c has a vulnerability C, and that the program 201d has a vulnerability D. Suppose that the program 201e has a vulnerability E, and that the program 201f has a vulnerability F. Suppose that the program 201g has a vulnerability G, and that the program 201h has a vulnerability H. Suppose, on the other hand, that the program 201b and the programs 201i to 201z do not have any vulnerability.

Figure 3:
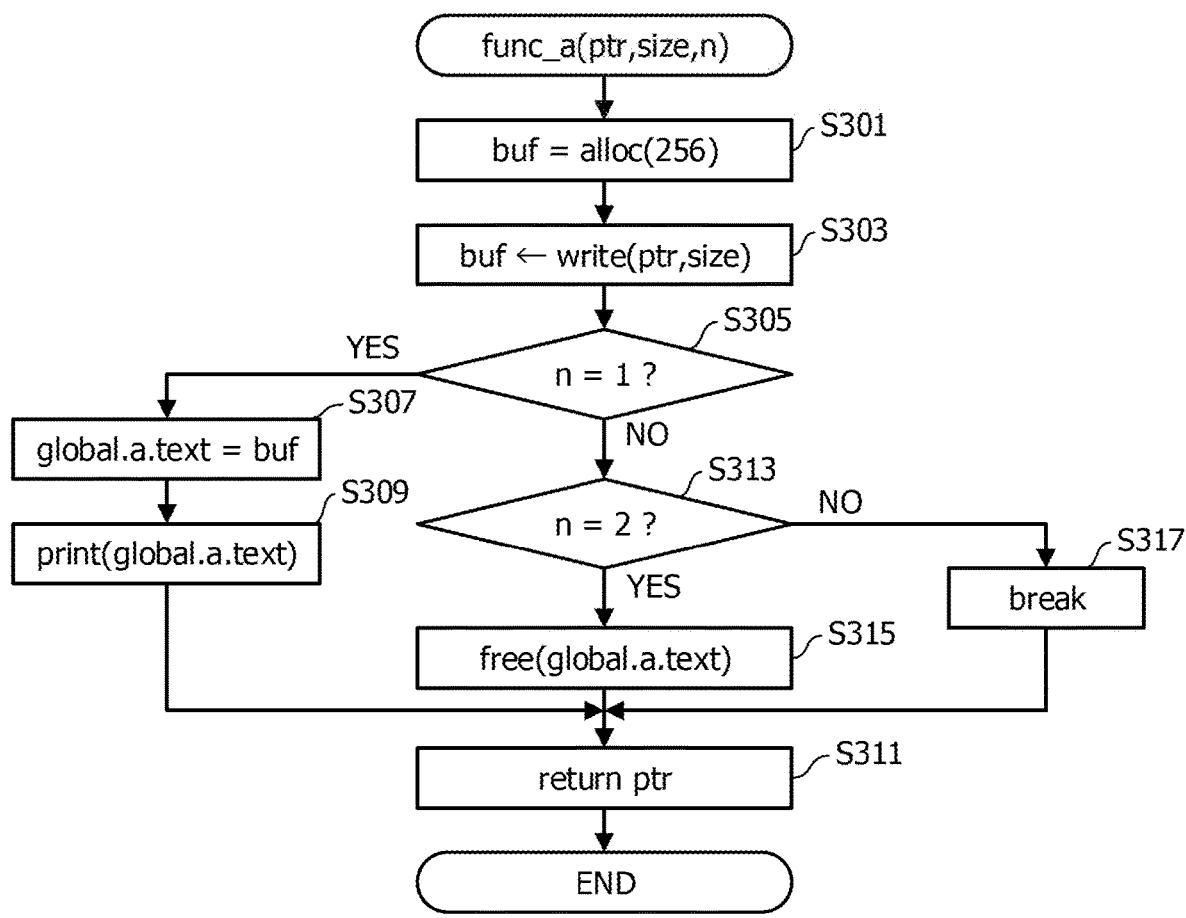
FIG. 3 is a diagram illustrating an example of a processing flow of a program.

FIG. 3 is a diagram illustrating an example of a processing flow of a program. An example of vulnerabilities will be described with reference to FIG. 3. A function func_a corresponds to the program 201a. The function func_a operates based on an argument ptr, an argument size, and an argument n. The argument ptr is a start address of character string data. The argument size is the length of the character string data. The argument n denotes an operation type.

A code of S301 indicates securing a buffer buf of 256 bytes. A code of S303 indicates writing character string data of the length size, the character string data starting at the start address ptr, to the buffer buf.

A code of S305 indicates determining whether or not the operation type n is one. When it is determined that the operation type n is one, the processing proceeds to S307. A code of S307 indicates setting the character string data stored in the buffer buf to a variable global.a.text. A code of S309 indicates outputting the character string data set to the variable global.a.text as a character string. A code of S311 indicates returning a return value ptr. The processing of the function func_a is then ended.

When it is determined in S305 that the operation type n is not one, on the other hand, the processing proceeds to S313. A code of S313 indicates determining whether or not the operation type n is two. When it is determined that the operation type n is two, the processing proceeds to S315. A code of S315 indicates freeing the variable global.a.text. The processing then proceeds to S311.

When it is determined in S313 that the operation type n is not two, the processing proceeds to S317. A code of S317 indicates ending processing accompanying a branch. The processing then proceeds to S311.

Vulnerabilities in the present example will be described in the following. An overflow may occur in the buffer buf in a case where the argument size when the function func_a is called exceeds 256. The operation of the OS may consequently be destabilized. In the present example, this problem will be referred to as a vulnerability A.

In addition, the contents of the variable global.a.text freed in S315 thereafter remain retained in a memory. Hence, there is a fear of the above-described character string data being read from another function. If a security code leaks out, spoofing by an attacker may occur. In the present example, this problem will be referred to as a vulnerability B.

Modes of vulnerability are not limited to the examples of the vulnerability A and the vulnerability B. In addition, a program 201 may include a plurality of functions.

The description returns to FIG. 2. Suppose in the present example that malware operates in an application layer. The malware focuses on vulnerability, and makes the program 201 perform an abnormal operation. For that purpose, the malware repeats a trial using an exploit, which is a tool used for vulnerability verification. In the present example, a trial unit 203a makes an abnormal processing request focusing on the vulnerability A by using an exploit A for verifying the vulnerability A. Similarly, trial units 203b to 203h individually make abnormal processing requests focusing on the respective vulnerabilities B to H by using exploits for verifying the vulnerabilities. The processing requests are, for example, system calls.

An example of processing of the malware will be described in the following with reference to FIG. 4. Suppose that the malware intends to seize a root privilege and alter management data of the OS.

The trial unit 203a performs trial processing (A) (S401). The trial processing (A) attempts to seize the root privilege by making an abnormal processing request focusing on the vulnerability A and a normal processing request. When it is determined in S403 that the seizure of the root privilege succeeds, the malware alters the management data of the OS (S405).

When it is determined in S403 that the seizure of the root privilege fails, on the other hand, the trial unit 203b performs trial processing (B) (S407), and the trial unit 203c performs trial processing (C) (S409). The trial processing (B) makes a processing request focusing on the vulnerability B. The trial processing (C) attempts to seize the root privilege by performing a processing request focusing on the vulnerability C with a result of the trial processing (B) as a precondition. When it is determined in S411 that the seizure of the root privilege succeeds, the malware alters the management data of the OS (S405).

Figure 5:
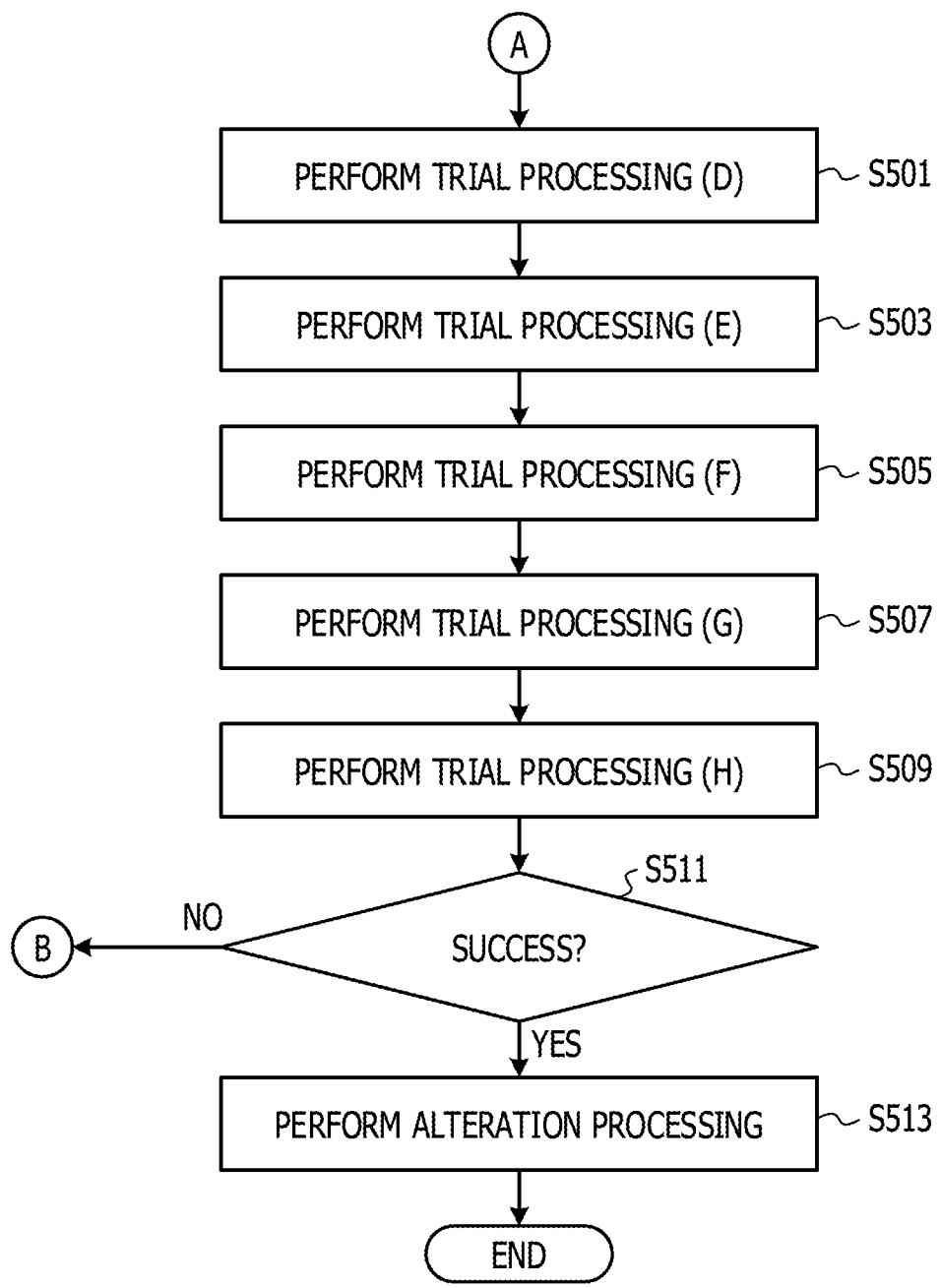
FIG. 5 is a diagram illustrating an example of a processing flow of malware.

When it is determined in S411 that the seizure of the root privilege fails, on the other hand, the processing proceeds to S501 illustrated in FIG. 5 via a terminal A.

FIG. 5 is a diagram illustrating an example of a processing flow of malware. The trial unit 203d performs trial processing (D) (S501), and the trial unit 203e performs trial processing (E) (S503). The trial processing (D) makes a processing request focusing on the vulnerability D. The trial processing (E) makes a processing request focusing on the vulnerability E.

Next, the trial unit 203f performs trial processing (F) (S505), and the trial unit 203g performs trial processing (G) (S507). The trial processing (F) makes a processing request focusing on the vulnerability F. The trial processing (G) makes a processing request focusing on the vulnerability G.

Finally, the trial unit 203h performs trial processing (H) (S509). The trial processing (H) attempts to seize the root privilege by making an abnormal processing request focusing on the vulnerability H with a result of the trial processing (D) to (G) as a precondition. When it is determined in S511 that the seizure of the root privilege succeeds, the malware alters the management data of the OS (S513).

Figure 4:
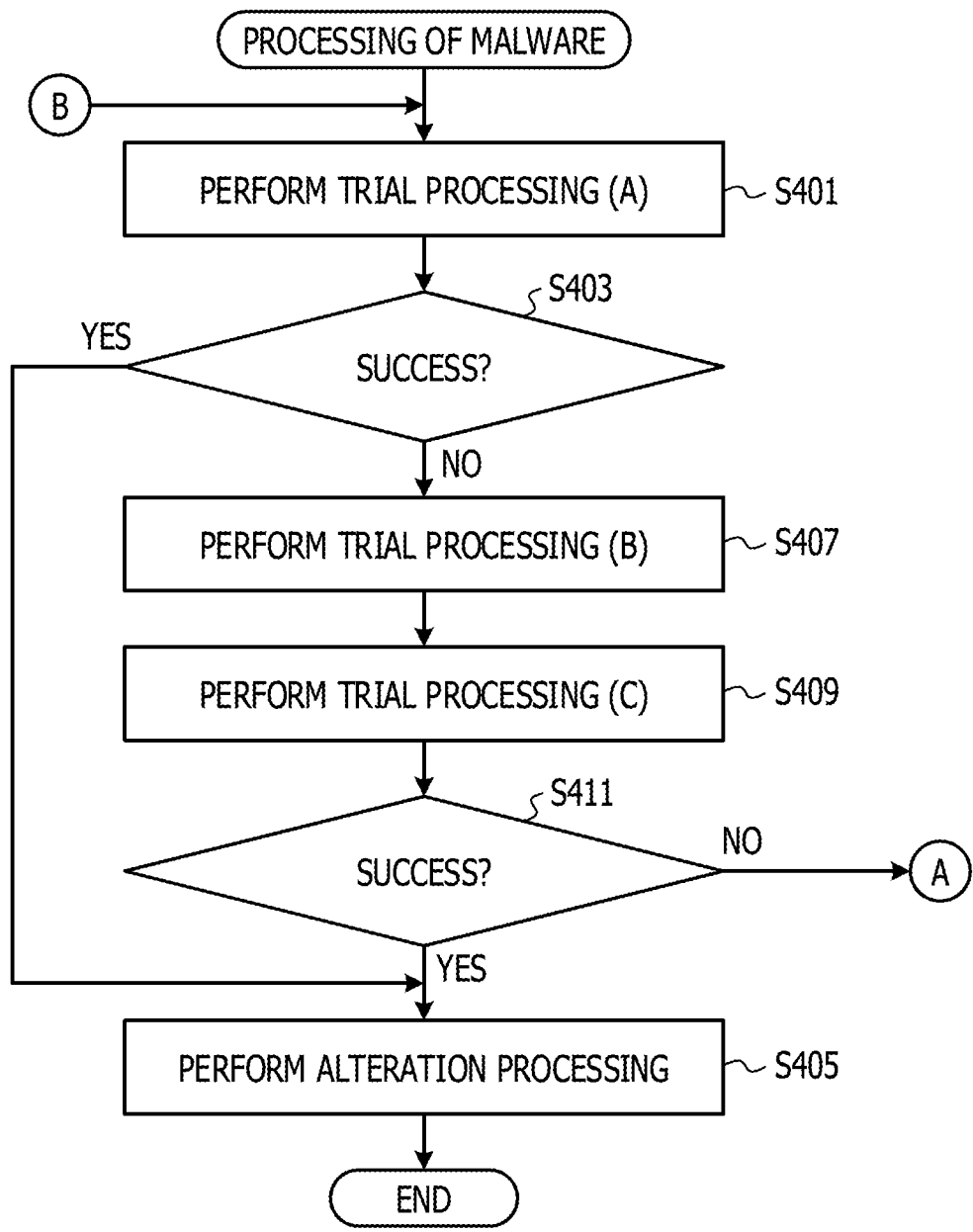
FIG. 4 is a diagram illustrating an example of a processing flow of malware.

When it is determined in S511 that the seizure of the root privilege fails, on the other hand, the processing returns to S401 illustrated in FIG. 4 via a terminal B to repeat the above-described processing.

FIG. 4 illustrates an example in which the flow of the processing is controlled in the malware itself. However, the flow of the processing may not be controlled in the malware. For example, the flow of the processing may be controlled by instructions from an external device operated by an attacker.

Thus, the malware often repeats various trials. When the trials are repeated, a remaining vulnerability may be found and used as a clue for an attack.

On the other hand, when a provider of the OS finds a vulnerability in the program 201, a program corrected to solve the vulnerability (which program will hereinafter be referred to as a corrected program) is created. The corrected program may be referred to as a patch. The corrected program is provided with countermeasures for protection from erroneous operation or unauthorized operation caused by the vulnerability.

Figure 6:
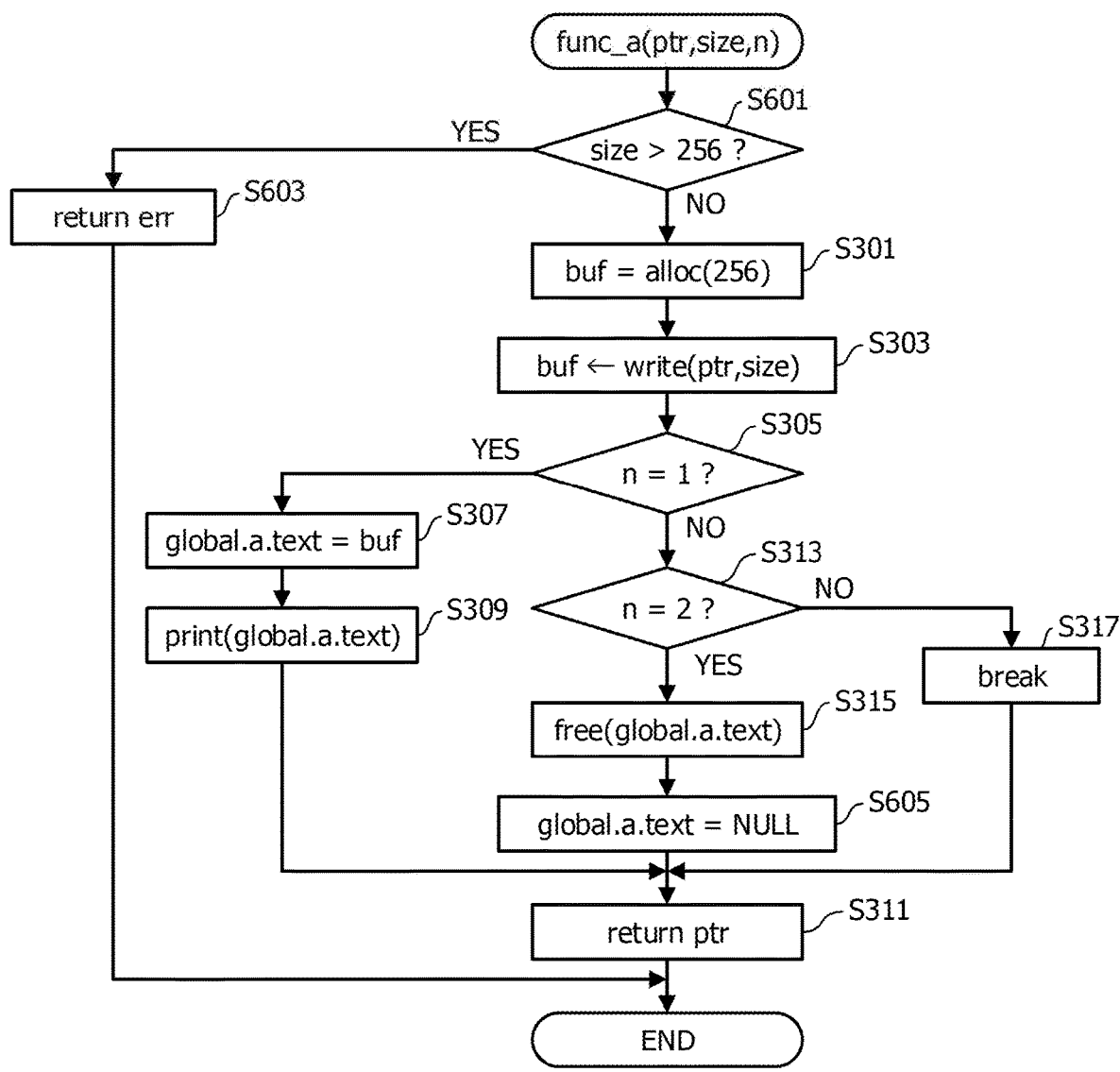
FIG. 6 is a diagram illustrating an example of a processing flow of a corrected program in related technology.

A corrected program in related technology will be described with reference to FIG. 6. A code of S601 indicates determining whether or not the argument size exceeds 256. When it is determined that the argument size exceeds 256, the processing proceeds to S603. A code of S603 indicates returning a return value indicating an error. The processing of the function func_a is then ended.

Thus, the processing from S301 on down is not performed in a case where the argument size when the function func_a is called exceeds 256. Hence, there is no fear of an overflow occurring in the buffer buf. For example, the vulnerability A is solved. S601 and S603 correspond to countermeasure processing related to the vulnerability A (which countermeasure processing will hereinafter be referred to as countermeasure processing A).

In addition, processing of S605 is performed after processing of S315. A code of S605 indicates clearing the contents of the variable global.a.text.

Thus, there is no fear of the character string data set to the variable global.a.text being read from another function. For example, the vulnerability B is solved. S605 corresponds to countermeasure processing related to the vulnerability B (which countermeasure processing will hereinafter be referred to as countermeasure processing B).

A defense against an attack is provided by substituting such a corrected program. However, the related technology does not determine that an attack is being made.

Figure 7:
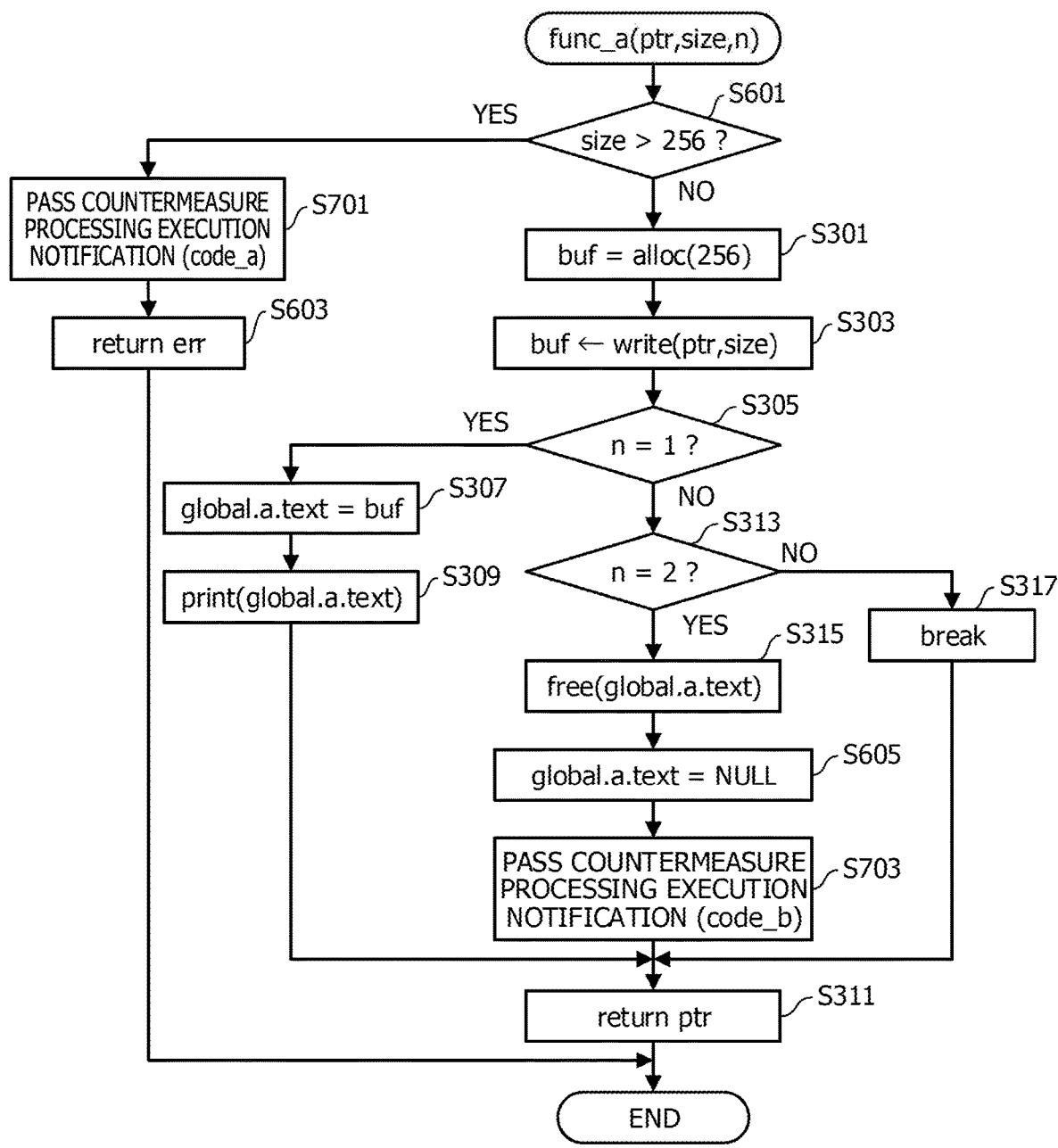
FIG. 7 is a diagram illustrating an example of a processing flow of a corrected program in a first embodiment.

A corrected program in the present embodiment notifies a monitoring unit of the OS layer that countermeasure processing is performed. FIG. 7 illustrates an example of a processing flow of the corrected program in the present embodiment. When it is determined in S601 that the argument size exceeds 256, processing of S701 is performed before proceeding to processing of S603. In S701, the function func_a passes a notification indicating that the countermeasure processing A is performed to the monitoring unit. For example, an identifier (code_a) of the countermeasure processing A is included in the notification.

In addition, processing of S703 is performed after processing of S605. In S703, the function func_a passes a notification indicating that the countermeasure processing B is performed to the monitoring unit. For example, an identifier (code_b) of the countermeasure processing B is included in the notification.

FIG. 8A illustrates an outline of notifications by a corrected program. In the present example, the program 201a is replaced with a corrected program 801a. In addition, the program 201c is replaced with a corrected program 801c. The other programs 201 are similar to those of FIG. 2.

As described above, when the corrected program 801a performs the countermeasure processing A in response to an abnormal processing request focusing on the vulnerability A, the corrected program 801a passes a notification including the identifier (code_a) of the countermeasure processing A to a monitoring unit 802. When the corrected program 801a performs the countermeasure processing B in response to a processing request focusing on the vulnerability B, the corrected program 801a passes a notification including the identifier (code_b) of the countermeasure processing B to the monitoring unit 802. In addition, when the corrected program 801c performs countermeasure processing C in response to a processing request focusing on the vulnerability C, the corrected program 801c passes, to the monitoring unit 802, a notification including an identifier (code_c) of countermeasure processing related to the vulnerability C (which countermeasure processing will hereinafter be referred to as countermeasure processing C).

Figure 8B:
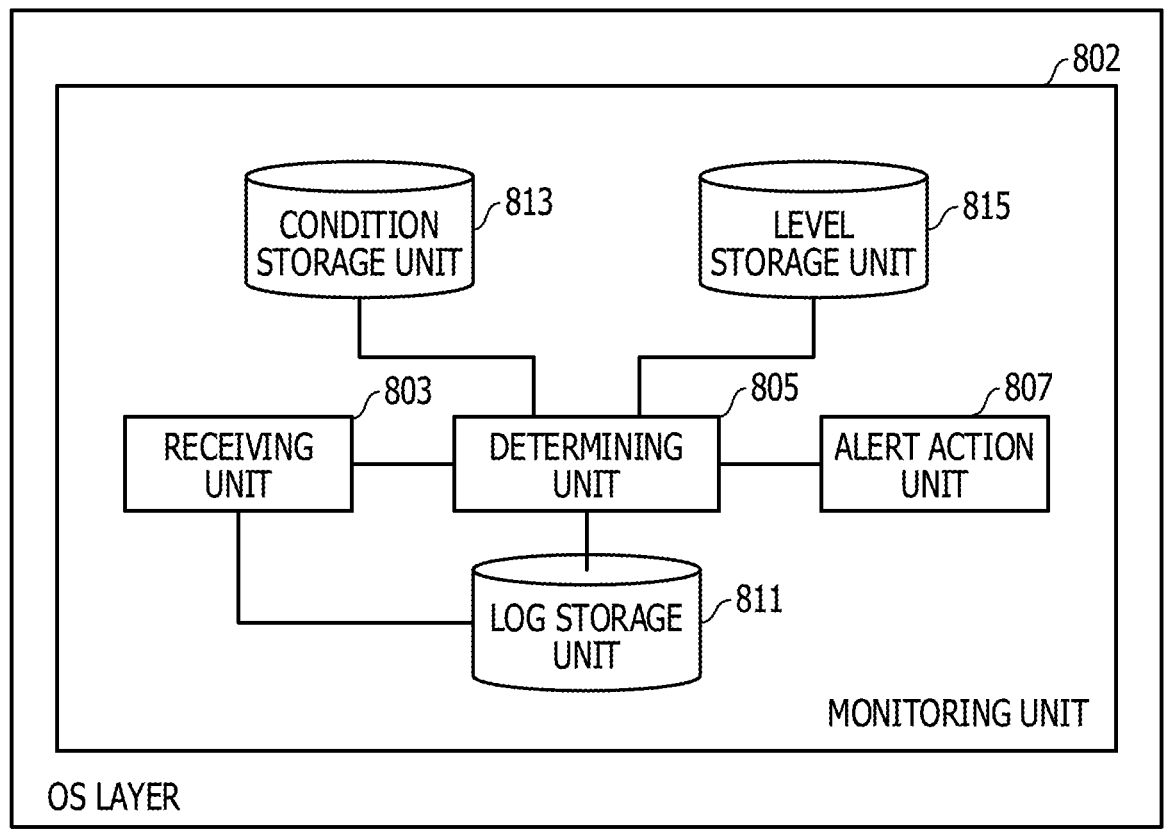
FIG. 8B is a diagram illustrating an example of a module configuration of a monitoring unit.

The monitoring unit 802 will next be described. FIG. 8B illustrates an example of a module configuration of the monitoring unit 802. The monitoring unit 802 includes a receiving unit 803, a determining unit 805, an alert action unit 807, a log storage unit 811, a condition storage unit 813, and a level storage unit 815. The monitoring unit 802 monitors for a behavior suspected of being an attack by malware. The receiving unit 803 receives countermeasure processing execution notifications. The determining unit 805 determines necessity of an alert. For example, when the monitoring unit 802 determines that there is an attack, the monitoring unit 802 performs alerting. When the monitoring unit 802 determines that there is no attack, the monitoring unit 802 does not perform alerting. The alert action unit 807 performs an alert action according to a result of the determination in the determining unit 805.

The log storage unit 811 stores a log table. The log table will be described later with reference to FIG. 10. The condition storage unit 813 stores a condition table. The condition table will be described later with reference to FIG. 11, FIGS. 13 to 16, and FIG. 18. The level storage unit 815 stores a level table. The level table will be described later with reference to FIG. 17.

The monitoring unit 802, the receiving unit 803, the determining unit 805, and the alert action unit 807 described above are implemented by using hardware resources (for example, FIG. 1) and a program for making the processor 101 perform processing to be described below.

The log storage unit 811, the condition storage unit 813, and the level storage unit 815 described above are implemented by using hardware resources (for example, FIG. 1).

Figure 9:
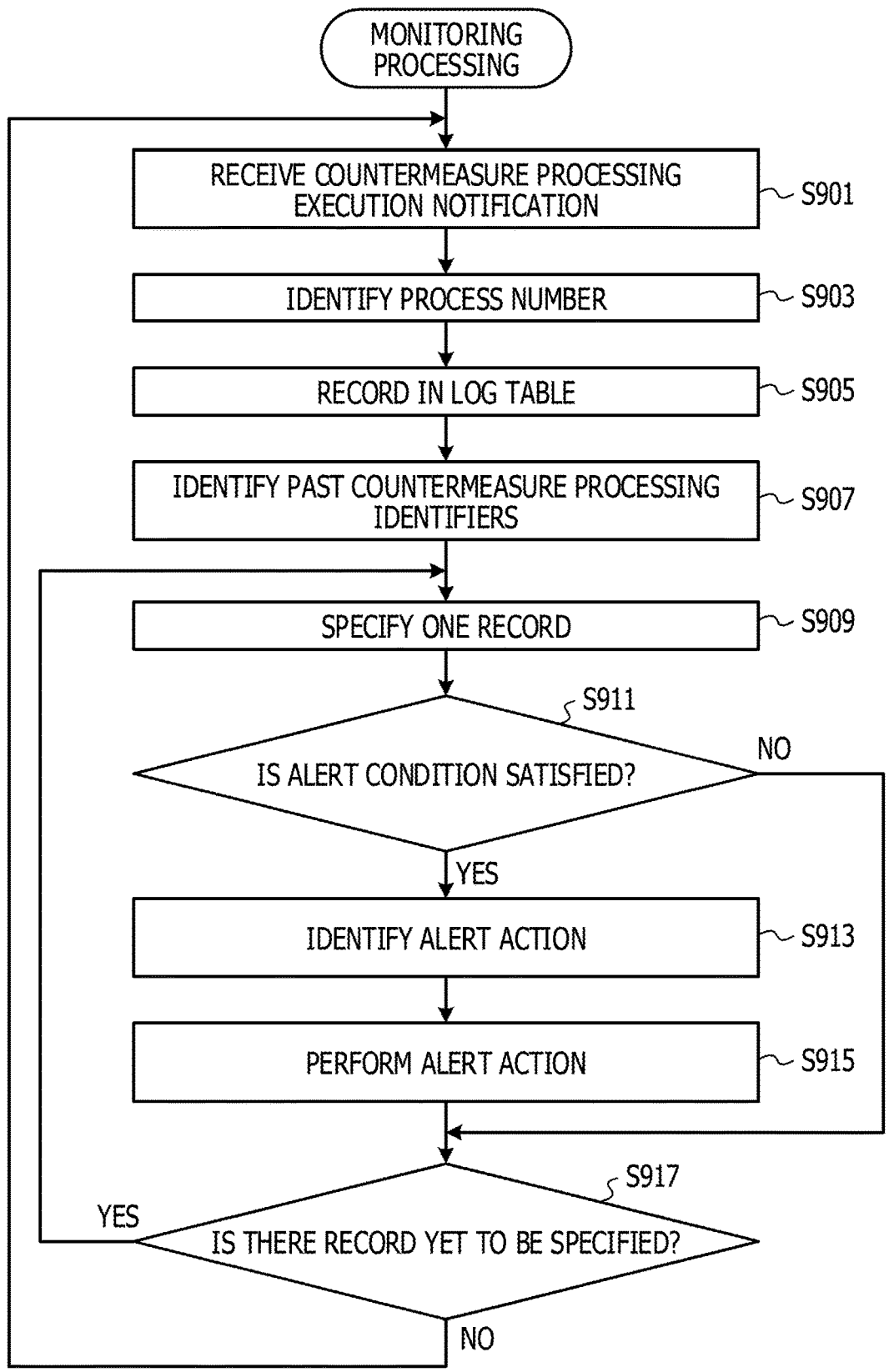
FIG. 9 is a diagram illustrating a flow of monitoring processing.

Processing in the monitoring unit 802 will next be described. FIG. 9 illustrates a flow of monitoring processing. The receiving unit 803 receives a countermeasure processing execution notification from one of the corrected programs 801 (S901).

The determining unit 805 identifies the number of a process requesting processing from the corrected program 801 as a notification source (S903). The determining unit 805 records, in the log table, a date and time, a countermeasure processing identifier included in the execution notification, and the process number (S905).

An example of the log table will be described with reference to FIG. 10. The log table in the present example includes records corresponding to countermeasure processing execution notifications. A record in the log table includes a field storing a date and time, a field storing a countermeasure processing identifier, and a field storing a process number. The date and time identifies a point in time of performing countermeasure processing.

For example, a first record indicates that at a date and time T1, processing is started in response to a request made by a process identified by a process number P1 and the countermeasure processing identified by the identifier code_a is performed.

The description returns to FIG. 9. In the present embodiment, S907 may be omitted. Hence, S907 will be described later.

The determining unit 805 specifies one record in the condition table (S909). An example of a condition table will be described with reference to FIG. 11. The condition table in the present example includes records corresponding to alert conditions. A record in the condition table includes a field in which an alert condition is set and a field in which an alert action is set.

The alert condition is a condition for determining that there is a situation in which alerting is to be performed. The alert condition in the present embodiment is the identifier of one piece of countermeasure processing. The alert action is an action performed for alerting against an attack. When the alert condition is satisfied, the alert action corresponding to the alert condition is performed.

For example, a first record indicates that power to the terminal device 100 is turned off when the countermeasure processing identifier included in the received countermeasure processing execution notification is code_a.

A second record also illustrated in FIG. 11 indicates that when the countermeasure processing identifier included in the received countermeasure processing execution notification is code_b, a process as a processing request source when the corresponding countermeasure processing is performed is deleted.

A third record also illustrated in FIG. 11 indicates that when the countermeasure processing identifier included in the received countermeasure processing execution notification is code_c, the software of a process as a processing request source when the corresponding countermeasure processing is performed is uninstalled.

A fourth record also illustrated in FIG. 11 indicates that a warning message is displayed when the countermeasure processing identifier included in the received countermeasure processing execution notification is code_d. Incidentally, suppose that the contents of the condition table are set in advance.

The description returns to FIG. 9. The determining unit 805 determines whether or not an alert condition is satisfied (S911). In the present embodiment, the determining unit 805 determines that an alert condition is satisfied when the countermeasure processing identifier included in the countermeasure processing execution notification received in S901 matches a countermeasure processing identifier set as an alert condition in the record specified in S909.

When determining that an alert condition is satisfied, the determining unit 805 identifies an alert action set in the record specified in S909 (S913). Then, the alert action unit 807 performs the alert action (S915).

Figure 12:
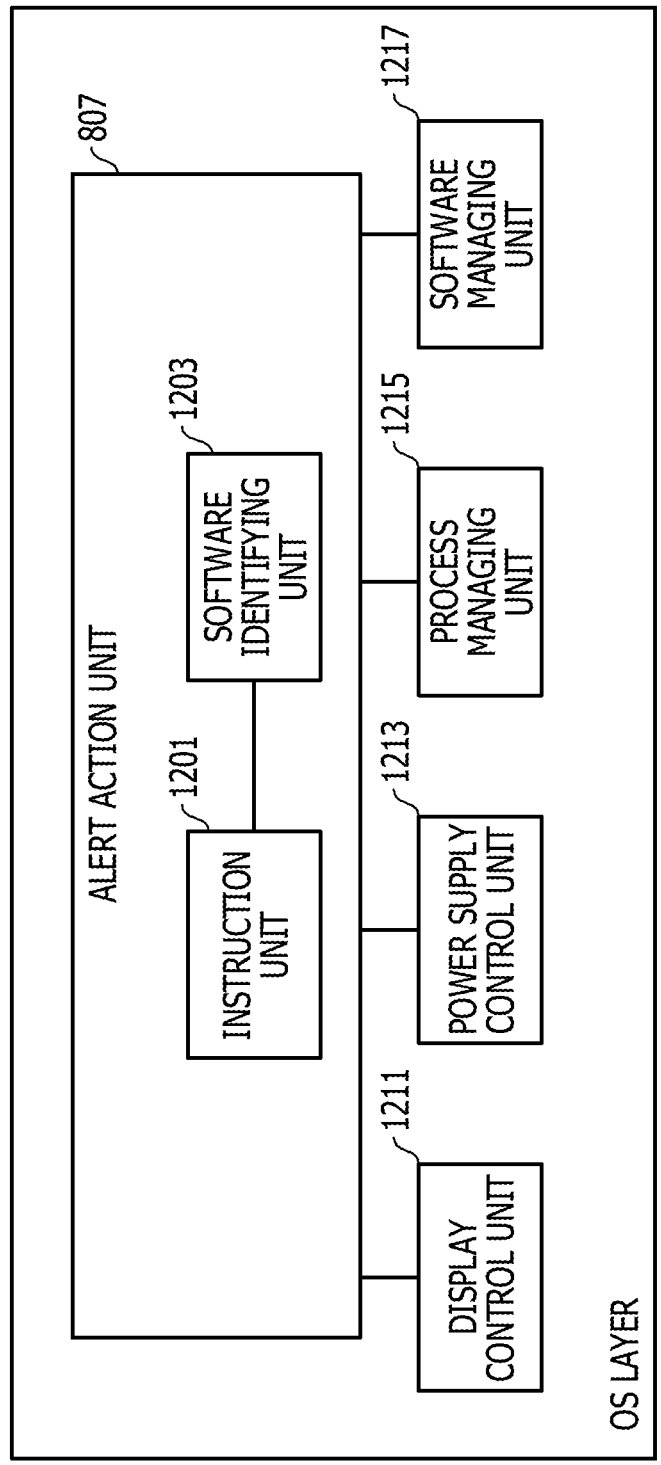
FIG. 12 is a diagram illustrating an example of a module configuration of an alert action unit.

The alert action will be described in the following. FIG. 12 illustrates an example of a module configuration of the alert action unit 807. The alert action unit 807 includes an instructing unit 1201 and a software identifying unit 1203.

For example, when the alert action is "display of warning message," the instructing unit 1201 instructs a display control unit 1211 to display a warning message. The display control unit 1211 displays a warning message on the display 121 according to the instruction.

When the alert action is "power off," for example, the instructing unit 1201 instructs a power supply control unit 1213 to turn off power. The power supply control unit 1213 turns off power according to the instruction.

When the alert action is "process deletion," for example, the instructing unit 1201 instructs a process managing unit 1215 to delete the process identified by the process number. The process managing unit 1215 deletes the process identified by the process number according to the instruction.

When the alert action is "uninstallation," for example, the software identifying unit 1203 identifies software corresponding to the process number, and the instructing unit 1201 instructs a software managing unit 1217 to uninstall the software. The software managing unit 1217 uninstalls the software according to the instruction.

The instructing unit 1201, the software identifying unit 1203, the display control unit 1211, the power supply control unit 1213, the process managing unit 1215, and the software managing unit 1217 described above are implemented by using hardware resources (for example, FIG. 1) and a program for making the processor 101 perform processing to be described in the following.

The description returns to FIG. 9. When it is determined in S911 that the alert condition is not satisfied, on the other hand, the processing directly proceeds to S917.

The determining unit 805 determines whether or not there is a record yet to be specified (S917). When it is determined that there is a record yet to be specified, the processing returns to S909 to repeat the above-described processing. When it is determined that there is no record yet to be specified, on the other hand, the processing returns to S901 to repeat the above-described processing.

According to the present embodiment, an attack focusing on a vulnerability of a program is detected easily.

Second Embodiment

In a present embodiment, description will be made of an example in which presence or absence of an attack is determined based on a combination of countermeasure processing identifiers.

FIG. 13 illustrates an example of a condition table in a second embodiment. Alert conditions in the present embodiment each include a plurality of countermeasure processing identifiers. When pieces of countermeasure processing identified by these identifiers are performed, it means that there is a situation in which alerting is to be performed. However, order in which the pieces of countermeasure processing are performed is arbitrary.

For example, a first record indicates that power to the terminal device 100 is turned off when a countermeasure processing identifier included in a latest countermeasure processing execution notification is either code_b or code_c and the other identifier is included in a past countermeasure processing execution notification. For example, the alert condition holds when a notification including code_b is received first and thereafter a notification including code_c is received. Further, the alert condition also holds when a notification including code_c is received first and thereafter a notification including code_b is received.

While an example has been illustrated above in which each alert condition includes two countermeasure processing identifiers, each alert condition may include three or more countermeasure processing identifiers. In addition, the alert conditions in the foregoing embodiment and the alert conditions in the present embodiment may be used in combination.

In the present embodiment, monitoring processing is performed along the flow illustrated in FIG. 9. However, following the processing of S905, the determining unit 805 identifies past countermeasure processing identifiers based on the log table (S907). The determining unit 805 identifies the past countermeasure processing identifiers by tracing back from the latest countermeasure processing identifier included in the notification received in S901. The determining unit 805, for example, identifies identifiers of countermeasure processing performed after a point in time identified by tracing back for a given time from a present time. The determining unit 805 may identify identifiers of countermeasure processing performed after the terminal device 100 is started. The determining unit 805 may extract a past countermeasure processing identifier corresponding to the same process number as the process number associated with the latest countermeasure processing identifier.

In S911, the determining unit 805 determines that the alert condition is satisfied when the latest countermeasure processing identifier is included in an alert condition and an identifier other than the latest countermeasure processing identifier in the alert condition matches one of the past countermeasure processing identifiers identified in S907. The other processing is similar to that of the first embodiment.

According to the present embodiment, an attack combining trials related to a plurality of vulnerabilities is detected easily.

Third Embodiment

In the foregoing embodiment, description has been made of an example in which the order of identifiers combined in an alert condition is arbitrary. However, in the present embodiment, description will be made of an example in which the order of identifiers is limited.

FIG. 14 illustrates an example of a condition table in a third embodiment. Alert conditions in the present embodiment each include a plurality of countermeasure processing identifiers. When pieces of countermeasure processing are performed according to set order, it means that there is a situation in which alerting is to be performed.

For example, a first record indicates that power to the terminal device 100 is turned off when a countermeasure processing identifier included in a latest countermeasure processing execution notification is code_c and the identifier code_b is included in a past countermeasure processing execution notification. For example, the alert condition holds when a notification including code_b is received first and thereafter a notification including code_c is received. The alert condition does not hold when a notification including code_c is received first and thereafter a notification including code_b is received.

While an example has been illustrated above in which each alert condition includes two countermeasure processing identifiers, each alert condition may include three or more countermeasure processing identifiers. In addition, the alert conditions in the foregoing embodiments and the alert conditions in the present embodiment may be used in combination.

In the present embodiment, monitoring processing is performed along the flow illustrated in FIG. 9. Processing of S907 is similar to that of the second embodiment.

In S911, the determining unit 805 determines that an alert condition is satisfied when the latest countermeasure processing identifier matches a last identifier set in the alert condition and an identifier other than the latest countermeasure processing identifier in the alert condition is included as a past countermeasure processing identifier in accordance with the order. The other processing is similar to that of the first embodiment.

According to the present embodiment, an attack in which a procedure of trials related to vulnerabilities is assumed is detected easily.

Fourth Embodiment

In a present embodiment, description will be made of an example in which presence or absence of an attack is determined based on the number of countermeasure processing execution notifications.

FIG. 15 illustrates an example of a condition table in a fourth embodiment. Alert conditions in the present embodiment are each related to a total number of countermeasure processing execution notifications (which total number will hereinafter be referred to as a total number of notifications). When the total number of notifications exceeds a given threshold value, it means that there is a situation in which alerting is to be performed.

For example, a first record indicates that uninstallation is performed as an alert action when the total number of notifications is equal to or more than ten.

For example, a second record indicates that process deletion is performed as an alert action when the total number of notifications is equal to or more than five and less than ten.

For example, a third record indicates that display of a warning message is made as an alert action when the total number of notifications is equal to or more than one and less than five.

Incidentally, the alert conditions in the foregoing embodiments and the alert conditions in the present embodiment may be used in combination.

In the present embodiment, monitoring processing is performed along the flow illustrated in FIG. 9. Processing of S907 is similar to that of the second embodiment.

In S911, the determining unit 805 obtains a total number of the latest countermeasure processing identifier and the past countermeasure processing identifiers identified in S907. This total number corresponds to the total number of notifications. Then, when the total number of notifications is included in a range set as an alert condition, the determining unit 805 determines that the alert condition is satisfied.

According to the present embodiment, alerting may be performed according to the number of trials related to vulnerabilities.

Fifth Embodiment

In a present embodiment, description will be made of an example of monitoring conditions based on the number of execution notifications related to countermeasure processing triggered by requests from a same process (which number will hereinafter be referred to as the number of notifications related to a same process).

FIG. 16 illustrates an example of a condition table in a fifth embodiment. Alert conditions in the present embodiment each relate to the number of notifications related to a same process. When the number of notifications related to a same process exceeds a given threshold value, it means that there is a situation in which alerting is to be performed.

For example, a first record indicates that uninstallation is performed as an alert action when the number of notifications related to the same process is equal to or more than ten.

For example, a second record indicates that process deletion is performed as an alert action when the number of notifications related to the same process is equal to or more than five and less than ten.

For example, a third record indicates that display of a warning message is made as an alert action when the number of notifications related to the same process is equal to or more than one and less than five.

Incidentally, the alert conditions in the foregoing embodiments and the alert conditions in the present embodiment may be used in combination.

In the present embodiment, monitoring processing is performed along the flow illustrated in FIG. 9. Processing of S907 is similar to that of the second embodiment.

In S911, the determining unit 805 counts identifiers associated with the same process number as associated with the latest countermeasure processing identifier among the past countermeasure processing identifiers identified in S907. Then, the determining unit 805 obtains the number of notifications related to the same process by adding one to the count. The determining unit 805 determines that an alert condition is satisfied when the number of notifications related to the same process is included in a range set as the alert condition.

According to the present embodiment, an attack in which one process carries out a plurality of trials is identified easily.

Sixth Embodiment

In a present embodiment, description will be made of an example in which necessity of an alert is determined based on alert levels assigned to countermeasure processing.

Suppose in the present embodiment that an alert level is set in advance for each piece of countermeasure processing. FIG. 17 illustrates an example of a level table. The level table in the present example includes records corresponding to countermeasure processing. A record in the level table includes a field in which a countermeasure processing identifier is set and a field in which an alert level is stored.

For example, a first record indicates that an alert level associated with the execution of the countermeasure processing identified by the identifier code_a is high. For example, a fourth record indicates that an alert level associated with the execution of the countermeasure processing identified by the identifier code_d is low. There may be three or more alert levels.

FIG. 18 illustrates an example of a condition table in the sixth embodiment. Alert conditions in the present embodiment each relate to the number of notifications related to the execution of countermeasure processing at a same alert level. When the number of notifications corresponding to the same alert level exceeds a given threshold value, it means that there is a situation in which alerting is to be performed.

For example, a first record indicates that the turning off of power is performed as an alert action when the number of notifications corresponding to the high alert level is three or more.

For example, a second record indicates that display of a warning message is made as an alert action when the number of notifications corresponding to the low alert level is equal to or more than ten.

In the present embodiment, monitoring processing is performed along the flow illustrated in FIG. 9. Processing of S907 is similar to that of the second embodiment.

In S911, the determining unit 805 counts identifiers of the past countermeasure processing corresponding to the same alert level as that of the latest countermeasure processing among the past countermeasure processing identifiers identified in S907. Then, the determining unit 805 calculates the number of notifications associated with the alert level in question by adding one to the count. The determining unit 805 determines that an alert condition is satisfied when the alert condition is related to the number of notifications corresponding to the alert level in question and the calculated number of notifications is included in a range set as the alert condition.

According to the present embodiment, an excessive alert, for example, is avoided.

Embodiments of the present technology have been described above. However, the present technology is not limited thereto. For example, the above-described functional block configurations may not coincide with program module configurations.

In addition, the configuration of each storage area described above is an example, and does not have to be the configuration as described above. Further, also in the processing flows, the order of processing may be interchanged or a plurality of pieces of processing may be performed in parallel with each other as long as a processing result is not changed.

Embodiments of the present technology described above are summarized as follows.

An attack detecting device according to a present embodiment includes: (A) a receiving unit configured to receive a notification including an identifier of vulnerability countermeasure processing when the countermeasure processing is performed in a program to which the countermeasure processing is applied; and (B) a determining unit configured to determine presence or absence of an attack based on the identifier included in the received notification.

Thus, an attack focusing on a vulnerability of the program is detected easily.

Further, the determining unit may determine the presence or absence of the attack based on a combination of the identifiers.

Thus, an attack combining trials related to a plurality of vulnerabilities is detected easily.

Further, the determining unit may determine the presence or absence of the attack based on the identifiers ordered.

Thus, an attack in which a procedure of trials related to vulnerabilities is assumed is detected easily.

Further, the determining unit may determine the presence or absence of the attack based on the number of the notifications.

Thus, alerting may be performed according to the number of trials related to vulnerabilities.

Further, the determining unit may determine the presence or absence of the attack based on an alert level corresponding to the identifier.

Thus, an excessive alert, for example, is avoided.

Further, the determining unit may sort out identifiers of countermeasure processing performed by triggers of a same process.

Thus, an attack by one process is identified easily.

Incidentally, a program for making a processor perform processing based on the above-described method may be created, and the program may be stored in a computer readable storage medium or storage device such as a flexible disk, a compact disc (CD)-ROM, a magneto-optical disk, a semiconductor memory, or a hard disk. Incidentally, intermediate processing results are temporarily stored in a storage device such as a main memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A software attack detection device, the device comprising:
    a memory; and
    a processor coupled to the memory and the processor configured to execute a process, the process including:
    generating, when a first countermeasure process is applied to a program to address a vulnerability to a software attack, at least one notification including a first countermeasure identifier to identify the first countermeasure process;
    monitoring the at least one generated notification;
    identifying, when detecting the at least one generated notification, a past countermeasure identifier for a past countermeasure process by tracing back monitoring information from the first countermeasure identifier; and
    performing a second countermeasure process when detecting that the first countermeasure identifier and the past countermeasure identifier correspond to the second countermeasure process, wherein
    the memory stores the monitoring information relating to the at least one notification,
    the monitoring information includes the first countermeasure identifier of the first countermeasure process performed, a date and time the first countermeasure process was performed, a process of the program having the vulnerability the first countermeasure process was performed to address, an alert level of the first countermeasure process performed, a corrective action associated with the first countermeasure process, and an alert level of the corrective action.

2. The software attack detection device according to claim 1, wherein the at least one notification further includes at least one of an identifier of the program having the vulnerability and an identifier of a process of the program relating to the vulnerability.

3. The software attack detection device according to claim 1, wherein the process further includes:
    deciding whether an alert condition is satisfied based on the monitored at least one notification and the monitoring information stored in the memory, and
    triggering an alert as the second countermeasure process the when the alert condition is satisfied indicating a device including the software detection device experienced the software attack.

4. The software attack detection device according to claim 3, wherein the triggered alert causes an output to a user of the device, the output including at least one of a display of a message on a display of the device and an audible output of the device to indicate the software attack.

5. The software attack detection device according to claim 3, wherein the triggered alert causes the corrective action to be performed, the correction action including at least one of the device to power off, deletion of the process of the program having the vulnerability the first countermeasure process was performed to address, uninstallation of the program having the vulnerability, and display of a message on a display of the device.

6. The software attack detection device according to claim 1, wherein a plurality of countermeasure processes are applied to the program as the first countermeasure process; and
    wherein the determining determines the presence of the software attack based on a combination of countermeasure processes, included in the plurality of countermeasure processes, the combination of countermeasure processes being identified by countermeasure identifiers within the at least one notification.

7. The software attack detection device according to claim 6, wherein the determining determines the presence of the software attack based on an order of occurrence of the countermeasure processes, included in the plurality of countermeasure processes.

8. The software attack detection device according to claim 1, wherein the determining determines the presence of the software attack based on a number of countermeasure processes, as the first countermeasure process, identified within the at least one notification.

9. The software attack detection device according to claim 1, wherein the determining determines the presence of the software attack based on an alert level corresponding to the first countermeasure process.

10. The software attack detection device according to claim 1, wherein the process further includes: obtaining a number of countermeasure processes performed that are associated with a same process based on the monitoring information.

11. A non-transitory computer-readable storage medium storing a program that causes a computer to execute a process, the process comprising:
    generating, when a first countermeasure process is applied to the program to address a vulnerability to a software attack, at least one notification including a first countermeasure identifier to identify the first countermeasure process performed;
    monitoring the at least one generated notification;
    identifying, when detecting the at least one generated notification, a past countermeasure identifier for a past countermeasure process by tracing back monitoring information from the first countermeasure identifier; and
    performing a second countermeasure process when detecting that the first countermeasure identifier and the past countermeasure identifier correspond to the second countermeasure process, wherein
    the process further includes storing the monitoring information relating to the at least one notification,
    the monitoring information includes the first countermeasure identifier of the first countermeasure process performed, a date and time the first countermeasure process was performed, a process of the program having the vulnerability the first countermeasure process was performed to address, an alert level of the first countermeasure process performed, a corrective action associated with the first countermeasure process, and an alert level of the corrective action.

12. The non-transitory computer-readable storage medium according to claim 11, wherein the process further includes:
deciding whether an alert condition is satisfied based on the monitored at least one notification and the monitoring information; and
triggering an alert as the second countermeasure process when the alert condition is satisfied indicating a device including the program experienced the software attack.

13. A software attack detection method executed by a computer, the software attack detection method comprising:
generating, when a first countermeasure process is applied to a program to address a vulnerability to a software attack, at least one notification including a first countermeasure identifier to identify the first countermeasure process performed;
monitoring the at least one generated notification;
identifying, when detecting the at least one generated notification, a past countermeasure identifier for a past countermeasure process by tracing back monitoring information from the first countermeasure identifier; and
performing a second countermeasure process when detecting that the first countermeasure identifier and the past countermeasure identifier correspond to the second countermeasure process, wherein
the process further includes storing the monitoring information relating to the at least one notification,
the monitoring information includes the first countermeasure identifier of the first countermeasure process performed, a date and time the first countermeasure process was performed, a process of the program having the vulnerability the first countermeasure process was performed to address, an alert level of the first countermeasure process performed, a corrective action associated with the first countermeasure process, and an alert level of the corrective action.

14. The software attack detection method according to claim 13, further comprising:
deciding whether an alert condition is satisfied based on the monitored at least one notification and the monitoring information; and
triggering an alert as the second countermeasure process when the alert condition is satisfied indicating a device including the program experienced the software attack.

* * * * *